FIG. I
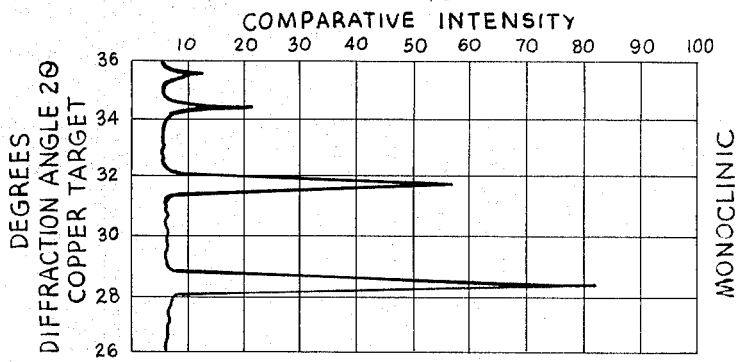
FIG. II
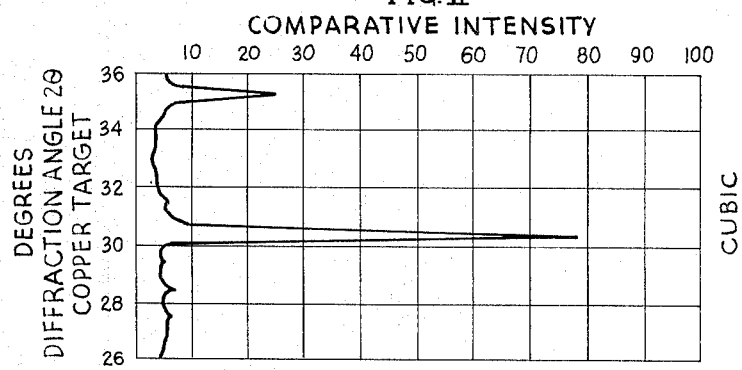
FIG. III
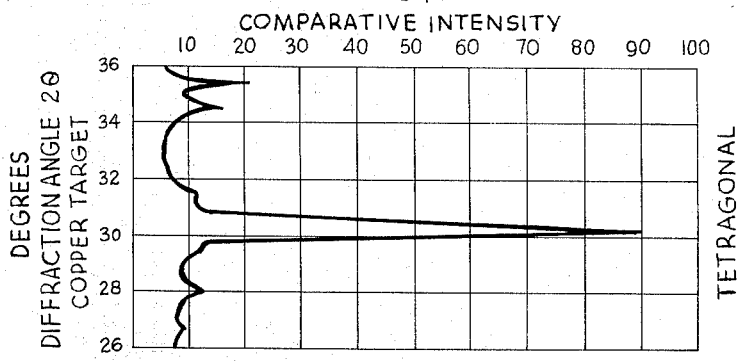
JOHN O. HAY, INVENTOR.
BY Dwight C Pond United States Patent Office 3,222,148
Patented Dec. 7, 1965

3,222,148
TETRAGONAL ZIRCONIUM OXIDE CONTAINING CALCIUM OXIDE
John O. Hay, Cleveland, Ohio, assignor to The Harshaw Chemical Company, Cleveland, Ohio, a corporation of Ohio
Filed Mar. 15, 1963, Ser. No. 265,553
3 Claims. (Cl. 51—309)

This application is a continuation-in-part of my application, Serial No. 95,713, filed March 14, 1961, now abandoned.

This invention relates to calcium oxide stabilized tetragonal zirconium oxide and to glass polishing compositions and methods employing calcium oxide stabilized tetragonal zirconium oxide.

Pure zirconium oxide is known to exist in two forms, monoclinic and tetragonal. At low temperatures, under about 1100° C., the prevailing form is monoclinic while above this temperature the tetragonal form predominates. According to U.S. Patent No. 2,910,371, pure zirconium oxide undergoes a reversible transformation from a monoclinic crystal structure that it has at low temperatures to a tetragonal crystal structure at around 1000° C.

The reversal of this transformation may be suppressed by the addition to the zirconia of alkaline earth oxides such as calcia or the like, prior to firing the mixture which, when fired, is a stable solid solution of cubic crystal structure at all temperatures from its melting point down to room temperature and below. The temperature often stated as the inversion point is 1000° C. However, it is known that purified zirconia in the monoclinic form persists on heating up to above 1170° C. while on cooling the tetragonal form prevails to below 1020° C. before the monoclinic is again formed. Changes from monoclinic to tetragonal and the reverse are not abrupt and the two types of crystals can coexist in varying proportions over a temperature range of perhaps as much as 70° C. above 1170° C., when heating, and more than 120° C. below 1020° C., when cooling. In addition, there are other well known impure crystal forms of zirconia; these forms being cubic and metastable tetragonal or low temperature tetragonal. Cubic zirconia is stable at all temperatures and has been found to be a solid solution of certain metallic oxides in zirconia. The metastable tetragonal or "low temperature form" of tetragonal zirconia is found when a zirconium salt has been largely but not quite decomposed by heat to zirconium oxide. The temperatures for this reaction are in the order of 400° C. to 600° C. with the time of heating also playing a part. The metastable form is also dependent on inclusion of impurities for its existence, these impurities being the remnants of the volatile anion in solid solution in what is otherwise pure zirconia. This metastable tetragonal form may be cooled from the temperature of its formation down to room temperature (20° C.) without change in form, but reverts to monoclinic on being cooled after having been heated to around 900° C. Thus, once the metastability is destroyed by heating sufficiently to drive out the remnants of the volatile anions, pure zirconium oxide results which is as usual monoclinic when at lower temperatures and tetragonal while at higher.

The forms of zirconium oxide have been well defined by means of X-ray diffraction patterns.

The characteristics patterns of three crystalline forms, the metastable tetragonal solid solution and the ordinary high temperature tetragonal being essentially the same, may be seen in the accompanying drawings which are graphs produced by plotting copper target X-ray intensity, using a Geiger counter, against the crystal diffraction angle $2\theta$.

FIG. 1 is a room temperature X-ray diffraction pattern of monoclinic zirconium oxide crystals.

FIG. 2 is a room temperature X-ray diffraction pattern of cubic zirconium oxide crystals.

FIG. 3 is a room temperature X-ray diffraction pattern of stabilized tetragonal zirconium oxide. It should be understood that all of these figures are "smoothed" slightly for purposes of illustration.

The constants are subject to slight shifts and changes in intensities due to the kind and nature of the impurities which may be present influencing the ultimate size of the crystals. However, the spacing relationship of the lines in the pattern one to the other, being based on the relationship of the crystal planes, will clearly indicate the crystal structure. The greatest characterization of the crystal structure in X-ray analysis is in the location of peaks, such locating being given in spacings along the base line or X axis as specific values of the diffraction angle $2\theta$. The numerals 26 to 36 along the base line in the figures are degrees of arc and signify the specific value of the angle $2\theta$ at those points on the diagram. In the case of monoclinic zirconium oxide the pattern as read on a recording X-ray diffractometer with copper target is characterized principally by two strong peaks at approximately 28° and 32°. In both cubic and tetragonal crystals there is one characteristically strong peak which falls between the location of the two monoclinic peaks at about 30°. The most readily discernible difference between the cubic zirconia and either metastable tetragonal zirconia or tetragonal zirconia is the fact that the cubic has a single moderately strong peak at about 35° while the tetragonal has two lesser peaks close to this point at about 34.8° and 35.4°. The 34.8° peak being somewhat lower than the 35.4° peak. Monoclinic zirconia also shows a pair of peaks in this region of 35.0°, but these peaks are further apart and the relative height is reversed in comparison with the peaks in the "twin" of the tetragonal. In mixtures of monoclinic and either cubic or tetragonal crystals these monoclinic peaks may tend to obscure the characteristic single or twin peaks of the latter two forms. However, the presence of monoclinic or the group of cubic solid solution and tetragonal is readily differentiated by reference to the strong peaks in the general region of from 28° to 35°. Further, if the twin peaks of the tetragonal are present there is no chance of confusing this phase with cubic zirconia. However, when preparing the form of zirconia known as the low temperature tetragonal or metastable tetragonal form, the very high peak at about 30.4° is always readily discernible, while the twin peaks at 34.8° and 35.4° may be so poorly developed from the amorphous matrix that they appear as a single low hump and might be confused with cubic zirconia except for the fact that on further heating at higher temperatures the twin peaks further develop and become resolved. Further examination or greater resolution may also serve to distinguish the tetragonal from the cubic form as there are other minor differences in the complete spectra which are evident to the skilled technician.

FIG. 3 will, in the light of what has just been said, serve to show the X-ray diffraction pattern for both the metastable tetragonal zirconia and a much more stable tetragonal variety. The metastability of the metastable, tetragonal form is believed to be due to inclusion therein of volatile anions of the salts from which that variety of zirconia was derived. Formation of the metastable material would have taken place in the temperature range about 400° C. to 600° C. As soon as this is heated sufficiently, the remnants of the volatile salts will volatilize and the metastability will be lost. In the practice of my invention, I prefer to use a non-volatile additive, such as lime, or the like, since this results in a much more stable tetragonal material capable of being heated and cooled repeatedly within a temperature range from room to its formation temperature which will always be in excess of 850° C. This stable tetragonal zirconium oxide can be made from the monoclinic variety whereas the metastable variety cannot.

It should be noted that in the definition of crytsalline structure, reference is usually made to $d$ values in A. rather than in the values of the $2\theta$ angles as the former are independent of the type of target used in the X-ray difffraction technique. The $d$ value, which is the spacing of a set of planes, is derived from Bragg's equation, which is $$\eta \lambda = 2d \sin \theta$$

where $\eta$ is the order number, where $\lambda$ is the X-ray wave length and $\theta$ is the X-ray angle of incidence. Specifically, the low temperature tetragonal form may be set forth in terms of $d$ A. as follows:

TABLE 1

*Low temperature tetragonal*

| d A | $I/I_o$ (Intensity) | $2\theta$ (Copper target) deg. |
|---|---|---|
| 2.943 | S | 30.4 |
| 2.578 | W | 34.8 |
| 2.537 | W | 35.36 |
| 1.800 | S | 50.72 |
| 1.548 | M | 59.24 |
| 1.532 | S | 60.38 |
| 1.471 | W | 63.22 |
| 1.288 | W | 73.42 |
| 1.267 | W | 74.88 |
| 1.172 | W | 82.18 |
| 1.163 | F | 82.98 |
| 1.147 | W | 82.36 |
| 1.139 | W | 85.10 |
| 1.048 | W | 94.65 |
| .993 | W | 101.7 |
| .981 | W | 103.5 |

$I_o$ = intensity of strongest peak.
I = intensity of individual lesser peaks.
S = visually strong.
M = visually moderate.
W = visually weak.
F = visually faint.

The stable tetragonal zirconia, which is the subject of this application, gives essentially indentical values, varying less than ±.05 A. from the above values.

Monoclinic zirconium oxide has long been used as a glass polishing medium. Recently issued U.S. Patent No. 2,934,416 discloses cubic zirconia as being more efficient in that it removes a greater amount of glass in a given time than does monoclinic. Neither crystal form utilizes to the fullest extent the polishing potential of zirconium oxide.

It is, therefore, an object of this invention to prepare a polishing composition containing stabilized tetragonal zirconium oxide.

It is another object of this invention to polish glass by means of a polishing medium employing calcium oxide stabilized tetragonal zirconium oxide.

It is still another object of this invention to prepare zirconia in a stable, tetragonal form of such stability that it will maintain its particular crystalline structure at room temperature after having been heated to a temperature in excess of 850° C.

I have now discovered that it is possible to prepare a superior polishing composition and more particularly a superior glass polishing composition by employing as a principal polishing ingredient stabilized tetragonal zirconium oxide. The tetragonal zirconium oxide suitable for the polishing compositions of this invention is prepared by mixing a calcium compound selected from the group consisting of calcium oxide, calcium oxalate, calcium hyroxide, calcium chloride, calcium carbonate, calcium acetate, calcium nitrate, with a zirconium compound selected from the group consisting of monoclinic zirconium oxide, zirconium oxychloride, zirconium hydrate, hydrated zirconium carbonate and zirconium oxalate or metastable tetragonal zirconia made from the salts in such proportions that the final composition of anhydrous oxide will contain 0.5% to 5% of calcium oxide, and calcining at a temperature of 850° C. to 1150° C. during which calcium oxide is dissolved in the zirconia.

Pure zirconium oxide is known to have a monoclinic structure at room temperature. The monoclinic structure will change on heating to the tetragonal structure due to a reversible polymorphic phase transformation at above 1170° C.

It is well known that the transformation back to the monoclinic form may be prevented by the addition of certain oxides, which thereby convert the high temperature tetragonal zirconia to the stabilized cubic form. Calcium oxide in amounts above 5% has been used commercially to stabilize the cubic form, such stabilization being effected by heating mixtures of monoclinic zirconia and lime or calcite to temperatures exceeding the transition temperature of 1170° C.

In view of commercial practice a most unexpected discovery is that by limiting the amount of calcium oxide to 0.5 to 5.0% and heating to below the transition temperature zirconia can be produced which is tetragonal in crystal structure. These compositions are highly suitable for polishing compositions as they have not been subjected to the excessive hardening and grain growth engendered by the high temperatures used in making cubic zirconia.

Zirconium oxide, thus stabilized, on cooling to room temperature retains the compact form of the tetragonal crystal and does not invert to the monoclinic form. Crystallites containing zirconia with monoclinic structure of the type such as those prepared by completely decomposing a metastable tetragonal solid solution of the kind heretofore known are presumably aggregates of very fine needle-like crystals which do not constitute a good polishing agent. However, some of the stabilized tetragonal zirconias may invert to the monoclinic form on heating to a temperature in excess of their production temperature, presumably because under these conditions calcium oxide is precipitated out of the zirconia solid solution. This degree of stabilization is a function of the calcium oxide and can be predicted from the amount of calcium oxide introduced.

I normally stabilize to such an extent that the material will remain in the tetragonal form on cooling, after having been subjected to heating from 850° C. to 1150° C., preferably 1000° C. to 1150° C.

The temperature at which the stabilization will be destroyed so that the crystal inverts to the ordinary monoclinic configuration when cooled to room temperature is known as the inversion temperature. The amount by which the inversion temperature of tetragonal to monoclinic is raised depends principally upon the amount of alkaline earth oxide introduced. It is limited to amounts of 5% or less, based on the $ZrO_2$ content, otherwise the inversion point will be entirely suppressed and on continued heating the well known cubic zirconia of commerce will result. The exact amount of calcia required to obtain stabilized tetragonal zirconia depends also to a minor extent on the degree of purity and the particle size of the zirconium salt used. Other impurities, notably silica, normally found in commercial zirconium compounds or in plant intermediates tend to have an additive effect so that zirconium salts of lesser purity in this respect will require less calcia to obtain the desired results than will those which are very pure. For each five parts of $SiO_2$ one part of $CaO$ may be omitted. On the other hand, sulfate, as an impurity will sequester at least a portion of the calcium as calcium sulfate, a compound which will not, as is necessary, release calcium as the oxide. This necessitates addition of more calcia than would be required for a sulfate free zirconia. For each part of sulfate ion impurity there should be added about half a part or 0.6 of a part of CaO. The temperature at which the mixture is calcined also has an effect on the product. Tetragonal crystals containing lesser amounts of calcia in solid solution invert to monoclinic zirconia at lower temperatures while those with greater amounts of calcia pass into the cubic form without the intermediate formation of any monoclinic at higher temperatures. I have found that a temperature between 850° C. and 1150° C., preferably 1000° C. to 1150° C., is desirable to make a product hard enough to polish glass yet soft enough to prevent scratching or grinding. This may be accomplished by the introduction of 0.5% to 5% and preferably 2% to 4.5% calcia into an otherwise reasonably pure zirconia. The time required at maximum temperature to achieve the desirable tetragonal material is not of great importance when the raw materials are salts of zirconium. It is merely necessary in practice to insure that the entire batch has arrived at the predetermined temperature. Prolonged heating will cause some crystal growth so that the X-ray diffraction pattern shows narrower and sharper peaks but this change is relatively slow and has little, if any, effect on the basic structure of the crystals. The diffraction pattern of these products does not show any CaO or $CaZrO_3$ to be present, indicating complete solution of the calcia in the zirconia.

Stabilized tetragonal zirconium oxide may also be prepared by incorporating calcium oxide directly into monoclinic zirconia. This is accomplished, similarly to the first method discussed, by heating a calcium salt and monoclinic zirconia to a temperature above about 950° C. Essentially, the same considerations as to the amount of calcia and the temperature required to make a desirable product apply. The two methods differ only in that in the latter case calcined monoclinic zirconia is used instead of a zirconium salt and that a definite period of time at the elevated temperature must be provided for the reaction to be completed.

The time required for this solid state reaction can be determined by trial and error but will be reasonably constant for any given type of zirconia. Zirconia of larger particle size and previously calcined at higher temperature will be expected to require longer reaction times.

Both cases yield crystalline products in which the calcia has entered into the zirconia crystal to form a solid solution. In properly made preparations the characteristic X-ray diffraction pattern of calcia is absent and the predominant zirconia pattern is that of the tetragonal solid solution. This second method of preparation, from monoclinic zirconia, clearly shows that the product is no longer the ordinary metastable solution of the literature which inverts when the volatile anion of a zirconium salt is completely removed by heating, thus furnishing monoclinic zirconia. It is indeed a stabilized tetragonal zirconia which can be changed only when heated at a high enough temperature to precipitate out of the solid solution a metallic oxide resulting in monoclinic or, if calcia is present in sufficient amount, cause it to assume a cubic configuration.

The manufacture of stabilized tetragonal zirconia is a relatively simple and economic operation. The zirconia of commerce may be mixed with the proper proportion of hydrated lime or calcium carbonate in any blending apparatus and charged to a kiln wherein the desirable temperature can be reached and maintained for a period of time. The mixing may be carried out in any convenient manner including dry mixing, coprecipitation, or precipitation of one constituent from a solution containing a suspension of the other or by adsorption of a solution of one on solid particles of the other; wet mixtures being at least partially dewatered before calcining. A gas fired rotary kiln may be used. If uncalcined zirconium hydrate or carbonate is available as in a plant producing commercial zirconia, these products in the wet or dry state may be mixed or blended with the hydrated lime or calcium carbonate and calcined. Such procedure which eliminates the intermediate calcining step to produce monoclinic zirconia permits an even greater economic advantage.

Again, "in process" intermediates of an integrated zirconia plant may be advantageously used, one such, for example, being impure zirconium oxychloride solution, the principal impurity being dissolved silica. This may be treated with a calculated amount of lime or calcium chloride. Zirconia with silica as an impurity may now be precipitated and adsorb a substantial amount of calcium hydroxide. Highly impure zirconia so obtained will on calcining also yield a tetragonal material. The effect of the silica being additive, less calcia is required. This is an economical alternative. $SiO_2$ may be absent or may be present to the extent of from 0.1% to 25%, preferably from 0.1% to 10% of the weight of the zirconia.

Comparative intensity values as shown on the drawings does not signify any fundamental value but is important as comparison of the various peaks with each other.

The following specific examples are illustrative of the manufacture of stabilized tetragonal zirconia suitable for use in polishing compositions:

EXAMPLE I

To a portion of uncalcined zirconium hydrate containing 200 parts by weight of $ZrO_2$ was added 10.57 parts of hydrated lime equivalent to 4% CaO based on the $ZrO_2$. These dry powders were thoroughly mixed in a mechanical blender. This mixture was then calcined at 1000° C. for one hour, wet ball-milled, filtered, and dried. The resulting product was a stabilized tetragonal zirconium oxide.

EXAMPLE II

A blend of two zirconium hydrates was used. These were made by a variation of the standard manufacturing method to give a small particle size. Hydrated lime was added in amount sufficient to produce after calcination a product containing 97% of zirconia and 3% of calcia. This mix was thoroughly blended and calcined at 1050° C. for an average period of twenty-five minutes to produce stabilized tetragonal zirconia. A small sample was also calcined for 4 hours at 1050° C. and showed no change in crystal form and only very slight crystal growth.

EXAMPLE III

Three liters of an aqueous solution of zirconium oxychloride containing between about 8% and 9% of $SiO_2$ based on the $ZrO_2$ content and a total acidity as hydrochloric acid combined and free in the range of about 127 grams per liter were made. Base solution was made to contain 552 grams of $Na_2CO_3$ and 35 grams of $Ca(OH)_2$ in 10.45 liters of water. The zirconium solution was added at room temperature to the base solution, with stirring, over a period of two hours. Agitation was continued for 20 minutes. The final pH was 4.3. The precipitate was allowed to settle overnight and the clear liquor decanted. The precipitate was then filtered and dried at 120° C. The dry cake was wet ball-milled, filtered and washed to remove soluble chlorides. The cake was dried at 120° C. to a soft and fluffy product. One portion of this material which is an impure carbonate was calcined for one hour at 1000° C. and a similar portion for one hour at 1050° C. Both materials were tetragonal zirconia containing 1% calcia and 8.5% silica. The samples showed excellent polishing characteristics. The polishing was effected with but relatively little abrasion of the glass being polished.

It should be borne in mind with regard to the foregoing examples that to make a commercial polishing agent from the commercial zirconia, it is also necessary to pay attention to the particle size of the material that is sold. Therefore, there may be added for this purpose milling operations and classification steps and/or the precipitation of the zirconium hydrate or carbonate may be controlled to produce a finer than ordinary particle size, methods for accomplishing this being well known in the art.

A glass polishing composition of the type I prefer to make consists primarily of the stable tetragonal zirconium oxide and water. The limiting factors on the ratio of the two is the speed of grinding and the ease of recirculating the slurry through the pumps and tubing of the polishing machinery. Ordinarily the zirconium oxide portion will constitute 10% to 60% of the slurry while water will be 90% to 40%. About 15% to 25% zirconium oxide seems to be most satisfactory.

In addition to the two main constituents small amounts of other materials may be present to condition the slurry. These are usually dry mixed with the zirconium oxide prior to making the water slurry and are given in percentages of the zironcium oxide. Of primary importance is that the zirconium oxide suspend well and be uniformly distributed in the slurry. To accomplish this a suspending and/or dispersing agent is added. Of the large number of these agents which are known and which would give relatively comparable results, we mention as examples the water soluble cellulose derivatives, by-products of such industries as the paper industry, such as calcium lignin sulfonate or carboxy methyl cellulose, bentonite and other clays or soluble natural gums such as arabic or starches. One or more of these reagents or others may be used generally in amounts less than 5% and preferably not over 2% of the weight of zirconium oxide.

In order to insure that these additives function correctly, it is also necessary to maintain the slurry at a pH such that their properties are fully utilized. In general, these additives require an alkaline medium so an alakali or alkaline salt is added in amount to give a pH of 7 to 11. Too high a pH is undesirable in that it might result in an attack on the glass chemically while with a lower pH many of the desirable dispersing agents fail to function well. An economic alkali to use is soda ash in amounts of less than 1% and preferably in the order of 0.1%.

Without limiting the amount or kind of additives other than as discussed above, a highly satisfactory composition of a polishing agent would be one of the following:

|  | #1 Parts | #2 Parts | #3 Parts |
|---|---|---|---|
| Water | 300.0 | 300.0 | 300.0 |
| Stable tetragonal zirconia | 61.5 | 61.5 | 61.5 |
| Bentonite | 0.6 | 0.6 | 0.6 |
| Calcium lignin sulfonate |  | 0.3 | 0.3 |
| Carboxy methylcellulose | 0.3 |  | 0.3 |
| Soda ash | 0.06 | 0.06 | 0.06 |

While the effectiveness of a polishing agent is sometimes taken as the loss in weight of the blank per unit of time, this is more a measure of grinding action than of polishing and while of interest is not a suitable criterion by which to evaluate these agents. Polishing in the glass industry is considered to be chemical as well as physical in nature as distinguished from the strictly physical removal of material known as grinding or abrading. Hence, we have developed and used a test which, based on the final appearance of the glass, minimizes any coincidental grinding action and stresses those chemical and physical energies required to yield the desired finish. In other words, the true test of a good polishing agent is whether the glass is satisfactorily polished and any coincidental grinding that removes more glass than required to achieve this is outside the function of the polishing agent. It is also obvious that the time required for a polish to be imparted is of commercial importance. Those polishing agents which are more rapid in reaching the desired degree of polish being more economical in the matter of cost per piece produced. Hence, my tests are based on comparisons of the polish produced at varying times against a set of graduated standards ranging in degree of polish from perfect to none at all. Number 1 is a perfect polish and number 9 is the ground surface before any polishing has taken place, with numbers 2 through 8 being graduated decreasing degrees of polish.

In testing the efficacy of these zirconias as glass polishing media a standard automatic bowl polishing machine equipped with pitch impregnated felt laps was used. The glass blanks were uniformly ground to a slight predetermined curve, and before polishing were quite translucent. The test slurry was made up to contain 62.5 grams of the polishing agent, stable tetragonal zirconia plus additives, per 300 ml. of water. The blanks were held against the lap at 7.5 pounds per square inch pressure. The first blank was given a polish of 2 minutes for each side and was discarded in order to condition the lap and eliminate other variables. A series of blanks were then run at 3, 6, 9, and 2 minutes for each side.

The 3, 6, 9, and 2 minute blanks after weighing for the loss incurred during polishing were compared with the standard series of partially polished blanks to judge the efficiency of polish in the time limit imposed by the experiment. At 9 minutes virtually all blanks have a perfect polish, but at 2 or 3 minutes there is considerable variation in the amount of polish. This is compared by noting the size and opacity of the unpolished center of the blank against a set of standards as due to the motion of the machine the polishing action is from the outside to the center of the blanks.

EXAMPLE IV

Uncalcinated zirconia (partially hydrated) of small particle size produced by commercial methods, was used as raw material. As a blank, a portion of this was calcined at 1150 C. for one hour, wet ball-milled, filtered and dried. It was mixed with minor amounts of standard wetting agents and a small amount of (0.1%) soda ash to obtain a material that would suspend in water slurry. This is Sample A.

To another 100 gram portion of the same uncalcined zirconia containing 91 grams of $ZrO_2$ was added 5.5 grams of hydrated lime, calculated to make a product containing 4.4% CaO. These dry powders were thoroughly mixed first in a mortar and then in a mechanical blender. This was then calcined at 1150° C. for one hour, disintegrated and mixed with the same suspending reagents as above. This is Sample B.

X-ray diffraction examination of A indicates it to be monoclinic zirconia with little or no tetragonal zirconia present. On the other hand Sample B shows the height of the tetragonal peak to be 60 units while the monoclinic peak is only 10 units, indicating a great preponderance of tetragonal zirconia.

Both A and B together with a commercial cubic zirconia (Sample C) and two commercial zirconias prepared especially for polishing Samples D and E were mixed with water in the proportion of 62.5 grams zirconia (inert ingredients and conditioning agents included) with 300 ml. of water and comparatively tested for polishing in the manner described. Sample F is a polishing grade of ceria which is a much more expensive polishing media than zirconia.

TABLE II

|  | A | B | C | D | E | F |
|---|---|---|---|---|---|---|
| Degree of polish in: |  |  |  |  |  |  |
| 3 min. 2 sides | 4 | 1½ | 7 | 6½ | 5 | 2 |
| 6 min. 2 sides | 1½ | 1 | 4 | 3 | 1½ | 1 |
| 9 min. 2 sides | 1 | 1 | 1 | 1 | 1 | 1 |
| 2 min. 2 sides | 6 | 5 | 6½ | 7 | 6½ | 6½ |
| Avg. weight removed per minute | .0172 | .0218 | .0111 | .0148 | .0194 | .0226 |
| Relative particle diameter (in microns) | 3.1 | 2.92 | 6.35 | 1.25 | .58 | .82 |

A number 1 polish is perfect while a number 9 is no polish at all

Sample B, the tetragonal crystal, gives a superior polish at all times, except that all other samples are polished at nine minutes and ceria at six minutes. It is also significant that the tetragonal crystal (B) gives a much better performance than the monoclinic crystal (A) prepared from the same starting material with the calcining conditions and the particle diameter being essentially the same in both cases.

Having thus described the invention, what is claimed is:

1. Tetragonal zirconium oxide consisting essentially of zirconium oxide and calcia, said tetragonal zirconium oxide being stable at all temperatures from room temperature to about 1150° C., the calcia being present in a proportion of 0.5% to 5% by weight of the zirconium oxide.

2. As a new composition of matter, a finely divided tetragonal zirconium oxide characterized in the X-ray diffraction pattern by a strong line at "$d$" value of 2.943 A. and two weaker lines at "$d$" values of 2.578 A. and 2.537 A. the latter being somewhat stronger, said tetragonal zirconium oxide being stable at all temperatures from 20° C. to 1150° C. and being a solid solution of calcium oxide in zirconium oxide, the calcium oxide being present in a proportion of 0.5% to 5.0% of the weight of the zirconium oxide.

3. A glass polishing composition consisting essentially of a major amount of water and a minor amount of the composition of matter defined in claim 1, the zirconia content of the polishing composition being from 10% to 60% by weight and the water content of such composition being from 90% to 40% by weight.

References Cited by the Examiner
UNITED STATES PATENTS

| | | | |
|---|---|---|---|
| 2,769,699 | 11/1956 | Polch | 51—309 |
| 2,934,416 | 4/1960 | Harris et al. | 51—309 |
| 2,996,369 | 8/1961 | Harris et al. | 51—309 |
| 3,110,681 | 11/1963 | Meadows et al. | 106—57 |

ALEXANDER H. BRODMERKEL, *Primary Examiner.*

D. J. ARNOLD, *Assistant Examiner.*